(12) United States Patent
Cruz

(10) Patent No.: US 10,437,240 B2
(45) Date of Patent: Oct. 8, 2019

(54) MANUFACTURING EVALUATION SYSTEM

(71) Applicant: Toyota Motor Engineering & Manufacturing North America, Inc., Erlanger, KY (US)

(72) Inventor: Carlo Cruz, Cincinnati, OH (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 186 days.

(21) Appl. No.: 15/263,744

(22) Filed: Sep. 13, 2016

(65) Prior Publication Data

US 2018/0074479 A1    Mar. 15, 2018

(51) Int. Cl.
*G05B 19/418*    (2006.01)

(52) U.S. Cl.
CPC ........... *G05B 19/41875* (2013.01); *G05B 2219/32368* (2013.01); *Y02P 90/22* (2015.11); *Y02P 90/26* (2015.11)

(58) Field of Classification Search
CPC .......................................... G05B 2219/32368
USPC ........................................................ 451/270
See application file for complete search history.

(56) References Cited

U.S. PATENT DOCUMENTS

| | | | |
|---|---|---|---|
| 6,470,240 B1 | 10/2002 | Haynes et al. | |
| 8,133,092 B2 | 3/2012 | Arcona et al. | |
| 8,510,081 B2 | 8/2013 | Boone et al. | |
| 8,517,870 B2 | 8/2013 | Crowley et al. | |
| 8,540,560 B2 | 9/2013 | Crowley et al. | |
| 8,579,632 B2 | 11/2013 | Crowley | |
| 8,951,106 B2 | 2/2015 | Crowley et al. | |
| 2007/0192173 A1 | 8/2007 | Moughler et al. | |
| 2008/0032601 A1* | 2/2008 | Arcona | B24B 23/00 451/1 |
| 2011/0022421 A1 | 1/2011 | Brown | |
| 2013/0068743 A1* | 3/2013 | Delin | B23K 37/0258 219/130.01 |
| 2014/0278828 A1 | 9/2014 | Dorcas | |
| 2015/0194073 A1* | 7/2015 | Becker | G09B 19/24 434/234 |
| 2015/0199775 A1 | 7/2015 | Pfeiffer et al. | |

(Continued)

FOREIGN PATENT DOCUMENTS

EP    2581168 A1    4/2013

*Primary Examiner* — Emilio J Saavedra
(74) *Attorney, Agent, or Firm* — Dinsmore & Shohl LLP

(57) ABSTRACT

Manufacturing evaluation systems including motion sensors are disclosed. A manufacturing evaluation system includes one or more motion sensors configured to output motion data in response to motions of a user in association with manufacturing of an article, a processor communicatively coupled to the one or more motion sensors, a memory module communicatively coupled to the processor, and machine readable instructions stored in the memory module. The machine readable instructions cause the manufacturing evaluation system to perform, when executed by the processor, receiving the motion data output by the one or more sensors, calculating a quality score associated with the article of manufacture based on the motion data, comparing the quality score to a quality score threshold, and providing a notification in response to comparing the quality score to the quality score threshold.

17 Claims, 5 Drawing Sheets

(56) References Cited

U.S. PATENT DOCUMENTS

| | | | | |
|---|---|---|---|---|
| 2016/0070958 A1* | 3/2016 | Whelan | ............... | A61B 5/7275 |
| | | | | 382/107 |
| 2016/0282858 A1* | 9/2016 | Michalscheck | ...... | G05B 19/406 |
| 2018/0060987 A1* | 3/2018 | Cardonha | ............ | G06Q 50/265 |
| 2018/0333079 A1* | 11/2018 | Szekely | ............... | A61B 5/6806 |

* cited by examiner

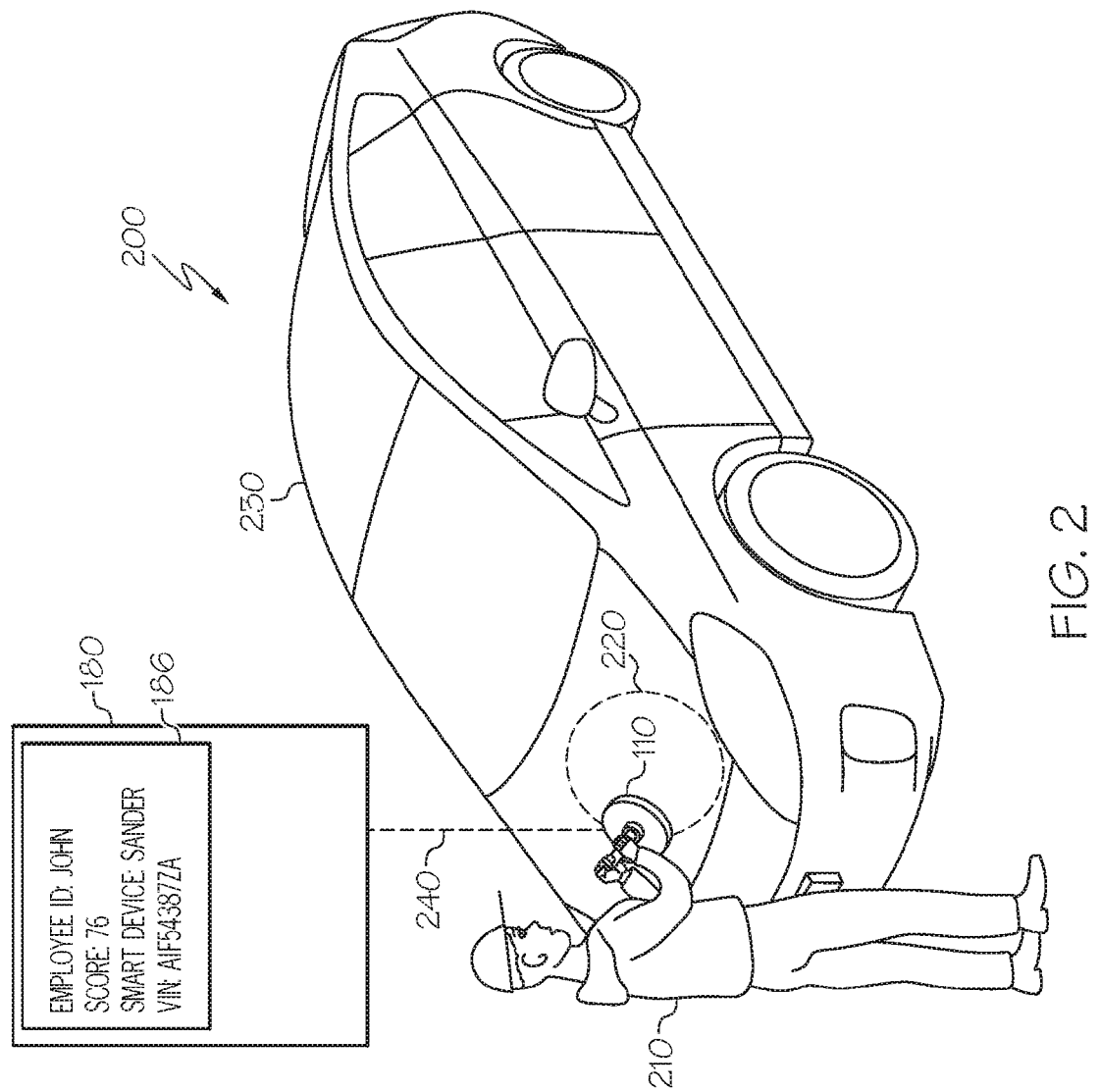

MANUFACTURING EVALUATION SYSTEM

TECHNICAL FIELD

The present specification generally relates to manufacturing evaluation systems and, more specifically, to manufacturing evaluation systems that calculate quality score of articles of manufacture based on motion data associated with manufacturing the articles.

BACKGROUND

Many workers with different levels of skill and experience may be involved in manufacturing articles. Accordingly, manufactured articles may have different quality depending on the skill level of those involved in manufacturing those articles. Traditionally, the motions of workers are not systematically monitored, but visually monitored by a supervisor from time to time. If the supervisor notices a worker operating a tool inappropriately, then she may give the worker some feedback manually. However, it is difficult to monitor all the workers and give them feedback manually. In addition, it is time consuming to determine which of the manufactured articles have low quality and what parts of each product have low quality or defaults due to different skill levels of workers.

Accordingly, a need exists for manufacturing evaluation systems that calculate quality score of articles of manufacture based on motion data associated with manufacturing the articles.

SUMMARY

In one embodiment, a manufacturing evaluation system includes one or more motion sensors configured to output motion data in response to motions of a user in association with manufacturing of an article, a processor communicatively coupled to the one or more motion sensors, a memory module communicatively coupled to the processor, and machine readable instructions stored in the memory module. The machine readable instructions cause the manufacturing evaluation system to perform, when executed by the processor, receiving the motion data output by the one or more sensors, calculating a quality score associated with the article of manufacture based on the motion data, comparing the quality score to a quality score threshold, and providing a notification in response to comparing the quality score to the quality score threshold.

In another embodiment, a method for providing manufacturing evaluation feedback includes receiving, at a computing device, motion data output by one or more sensors of at least one motion sensing device associated with a user manufacturing an article, calculating, by a processor of the computing device, a quality score associated with the article of manufacture based on the motion data, comparing, by the processor of the computing device, the quality score to a quality score threshold, and providing, by the processor of the computing device, a notification in response to comparing the quality score to the quality score threshold.

In yet another embodiment, a motion sensing device for providing manufacturing evaluation includes one or more sensors configured to obtain motion data of the motion sensing device associated with a user in response to motions of the user in association with manufacturing of an article, a processor communicatively coupled to the one or more sensors, a memory module communicatively coupled to the processor, and machine readable instructions stored in the memory module. The machine readable instructions cause the motion sensing device to perform, when executed by the processor, calculating a quality score associated with the article of manufacture based on the motion data, comparing the quality score to a quality score threshold, and providing a notification in response to comparing the quality score to the quality score threshold.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2 schematically depicts a perspective view of a manufacturing evaluation system including a motion sensing device and a computing device, according to one or more embodiments shown and described herein;

DETAILED DESCRIPTION

The embodiments disclosed herein include manufacturing evaluation systems including motion sensing devices. Referring generally to FIG. 2, a manufacturing evaluation system includes one or motion sensors, a processor, and a memory module. The manufacturing evaluation system receives motion data output by the one or more sensors, calculates a quality score associated with the article of manufacture based on the motion data, compares the quality score to a quality score threshold, and provides a notification in response to comparing the quality score to the quality score threshold. By providing notifications, the manufacturing evaluation systems described herein enhance the overall manufacturing quality and provide real-time feedback to workers. In some embodiments, the manufacturing evaluation system may indicate what portions of which vehicles have issues or poor quality by monitoring workers' motions with a plurality of motion sensors. Furthermore, the manufacturing evaluation system described herein may provide immediate feedback to workers with regard to any improper movements.

Figure 1:
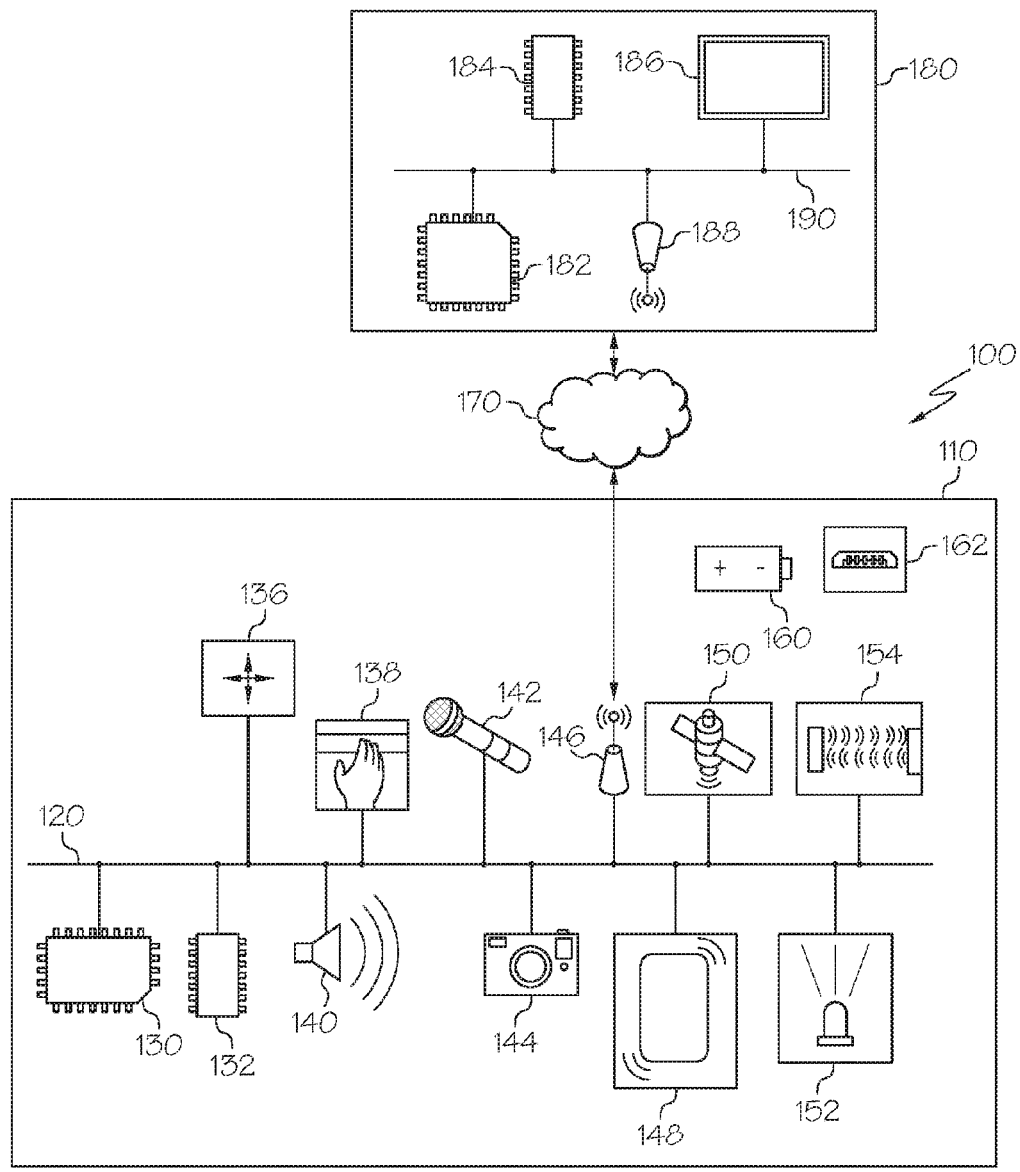
FIG. 1 schematically depicts a manufacturing evaluation system including a variety of sensors and electronic components, according to one or more embodiments shown and described herein.

Referring now to FIG. 1, one embodiment of a manufacturing evaluation system 100 is schematically depicted. The manufacturing evaluation system 100 includes a motion sensing device 110 and a computing device 180. The motion sensing device 110 may be any kind of motion sensing devices that may be used for manufacturing an article. For example, the motion sensing device 110 may be any smart device including, but not limited to, a smart sanding device, a smart application gun, a smart glove, a smart wearable device such as a smart helmet, a smart jacket, a smart wristband, etc.

The motion sensing device 110 may include a communication path 120, one or more processors 130, one or more memory modules 132, one or more motion sensors 136, tactile input hardware 138, one or more speakers 140, one or more microphones 142, one or more environment cameras 144, network interface hardware 146, one or more tactile feedback devices 148, one or more location sensors 150, one or more lights 152, one or more proximity sensors 154, one or more batteries 160, and one or more charging ports 162. The computing device 180 may include one or more processors 182, one or more memory modules 184, a display 186, and network interface hardware 188. The various components of the motion sensing device 110 and the computing device 180 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the motion sensing device 110. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the motion sensing device 110 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the motion sensing device 110 by the communication path 120. Accordingly, the communication path 120 may communicatively couple any number of processors with one another, and allow the components coupled to the communication path 120 to operate in a distributed computing environment. Specifically, each of the components may operate as a node that may send and/or receive data.

Each of the one or more memory modules 132 of the motion sensing device 110 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1GL, 2GL, 3GL, 4GL, or 5GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more motion sensors 136 is coupled to the communication path 120 and communicatively coupled to the one or more processors 130. The motion sensors 136 may include inertial measurement units. Each of the one or more motion sensors 136 may include one or more accelerometers and one or more gyroscopes. Each of the one or more motion sensors 136 transforms sensed physical movement of the motion sensing device 110 into a signal indicative of an orientation, a rotation, a velocity, or an acceleration of the motion sensing device 110. Some embodiments of the motion sensing device 110 may include an accelerometer but not a gyroscope, or may include a gyroscope but not an accelerometer. Although not shown in FIG. 1, the motion sensing device 110 may further include one or more sensors for detecting a temperature of environment and one or more sensors for detecting a humidity of environment.

Still referring to FIG. 1, the tactile input hardware 138 is coupled to the communication path 120 and communicatively coupled to the one or more processors 130. The tactile input hardware 138 may be any device capable of transforming mechanical pressure (e.g., the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. Each of the one or more speakers 140 transforms data signals from the processor 130 into audible mechanical vibrations. However, it should be understood that in other embodiments the motion sensing device 110 may not include the one or more speakers 140.

Each of the one or more microphones 142 is coupled to the communication path 120 and communicatively coupled to the one or more processors 130. Each of the one or more microphones 142 may be any device capable of transforming a mechanical vibration associated with sound into an electrical signal indicative of the sound. Some embodiments may not include the one or more microphones 142.

Each of the one or more environment cameras 144 is coupled to the communication path 120 and communicatively coupled to the one or more processors 130. Each of the one or more environment cameras 144 may be any device having an array of sensing devices (e.g., pixels) capable of detecting radiation in an ultraviolet wavelength band, a visible light wavelength band, or an infrared wavelength band. Each of the one or more environment cameras 144 may have any resolution. The one or more environment cameras 144 may include an omni-directional camera, or a panoramic camera. In some embodiments, one or more optical components, such as a mirror, fish-eye lens, or any other type of lens may be optically coupled to at least one of the one or more environment cameras 144. The one or more environment cameras 144 may be used to capture an image of a vehicle being manufactured or an image of environment.

The network interface hardware 146 is coupled to the communication path 120 and communicatively coupled to the one or more processors 130. The network interface hardware 146 may be any device capable of transmitting and/or receiving data via a network 170. Accordingly, the network interface hardware 146 can include a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 146 includes hardware configured to operate in accordance with the Bluetooth wireless communication protocol. In other embodiments, the network interface hardware 146 includes hardware configured to operate in accordance with a wireless communication protocol other than Bluetooth.

Still referring to FIG. 1, each of the one or more tactile feedback devices 148 is coupled to the communication path 120 and communicatively coupled to the one or more processors 130. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the manufacturing evaluation system 100 does not determine a location of the manufacturing evaluation system 100 or embodiments in which the location is determined in other ways (e.g., based on information received from the one or more environment cameras 144, the one or more microphones 142, the network interface hardware 146, the one or more proximity sensors 154, the one or more motion sensors 136 or the like).

Each of the one or more lights 152 is coupled to the communication path 120 and communicatively coupled to the one or more processors 130. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the motion sensing device 110 is powered on. In some embodiments, the one or more lights 152 include an activity indicator light that is illuminated when the motion sensing device 110 is active or processing data. In some embodiments, the one or more lights 152 output light indicating warnings that a user is not properly using the motion sensing device 110. Some embodiments may not include the one or more lights 152.

Each of the one or more proximity sensors 154 is coupled to the communication path 120 and communicatively coupled to the one or more processors 130. Each of the one or more proximity sensors 154 may be any device capable of outputting a proximity signal indicative of proximity of the motion sensing device 110 to a vehicle that is being manufactured. In some embodiments, the one or more proximity sensors 154 may include a laser scanner, a capacitive displacement sensor, a Doppler Effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the motion sensing device 110 to a vehicle being manufactured is determined from inputs provided by other sensors (e.g., the one or more environment cameras 144, the one or more speakers 140, etc.) or embodiments that do not determine a proximity of the motion sensing device 110 to a vehicle being manufactured.

The motion sensing device 110 is powered by the one or more batteries 160, each of which is electrically coupled to the various electrical components of the motion sensing device 110. Each of the one or more batteries 160 may be any device capable of storing electric energy for later use by the motion sensing device 110. In some embodiments, the one or more batteries 160 may include a rechargeable battery, such as a lithium-ion battery or a nickel-cadmium battery. In embodiments in which the one or more batteries 160 include a rechargeable battery, the motion sensing device 110 may include the one or more charging ports 162, each of which may be used to charge the one or more batteries 160. Some embodiments may not include the one or more batteries 160, such as embodiments in which the motion sensing device 110 is powered by solar energy or energy harvested from the environment. Some embodiments may not include the one or more charging ports 162, such as embodiments in which the motion sensing device 110 utilizes disposable batteries for power.

It should be understood that the components of the motion sensing device 110 (including, but not limited to the one or more processors 130, the one or more memory modules 132, the one or more motion sensors 136, the tactile input hardware 138, the one or more speakers 140, the one or more microphones 142, the one or more environment cameras 144, the network interface hardware 146, the one or more tactile feedback devices 148, the one or more location sensors 150, the one or more lights 152, the one or more proximity sensors 154, the one or more batteries 160, and the one or more charging ports 162) may be distributed among a variety of physical modules, each of which are communicatively coupled via a wireless network or a wired network. For example, in some embodiments described below, the components of the motion sensing device 110 may be distributed among a plurality of motion sensing devices, each of which may be wirelessly communicatively coupled or communicatively coupled via one or more wires. Furthermore, while the motion sensing device 110 depicted in FIG. 1 includes the one or more tactile feedback devices 148 and the one or more speakers 140 as possible feedback devices communicatively coupled to the one or more processors 130, embodiments are not limited thereto. In other embodiments, a feedback device other than the one or more tactile feedback devices 148 or the one or more speakers 140 may provide feedback to a user of the motion sensing device 110, such as in embodiments that provide feedback with a display module, or any other device capable of providing feedback to the user.

Still referring to FIG. 1, in some embodiments, the motion sensing device 110 may be communicatively coupled to the computing device 180 via the network 170. In some embodiments, the network 170 is a personal area network that utilizes Bluetooth technology to communicatively couple the manufacturing evaluation system 100 and the computing device 180. In other embodiments, the network 170 may include one or more computer networks (e.g., a personal area network, a local area network, or a wide area network), cellular networks, satellite networks and/or a global positioning system and combinations thereof. Accordingly, the manufacturing evaluation system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 may be utilized to communicatively couple the motion sensing device 110 with the computing device 180. The computing device 180 may include a mobile phone, a smartphone, a personal digital assistant, a camera, a dedicated mobile media player, a mobile personal computer, a laptop computer, and/or any other remote electronic device capable of being communicatively coupled with the motion sensing device 110.

The computing device 180 may include one or more processors 182, one or more memory modules 184, a display 186, a network interface hardware 188, and a communication path 190. The one or more processors 182 may be processors similar to the one or more processors 130 described above. The one or more memory modules 184 may be memories similar to the one or more memory modules 132 described above. The network interface hardware 188 may be interface hardware similar to the network interface hardware 146 described above. The communication path 190 may be a communication path similar to the communication path 120 described above.

The one or more processors 182 can execute logic to communicate with the motion sensing device 110. The computing device 180 may be configured with wired and/or wireless communication functionality for communicating with the motion sensing device 110. In some embodiments, the computing device 180 may perform one or more elements of the functionality described herein, such as in embodiments in which the functionality described herein is distributed between the motion sensing device 110 and the computing device 180. In some embodiments, the computing device 180 may provide a user interface through which one or more settings or configurations of the motion sensing device 110 may be altered (e.g., the ability to turn feedback on or off, adjusting the frequency of feedback, adjusting the type of feedback, etc.).

Referring now to FIG. 2, a perspective view of a manufacturing evaluation system 200 is schematically depicted. The manufacturing evaluation system 200 includes the motion sensing device 110 and the computing device 180. In one embodiment, a user 210 operates the motion sensing device 110 for manufacturing a vehicle 230. The motion sensing device 110 may be a smart sanding device for sanding a body of the vehicle 230.

As described with reference to FIG. 1, the motion sensing device 110 includes motion sensors 136 which detect the motion of the motion sensing device 110. The motion sensors 136 may include, but not limited to, accelerometers, angular rate gyros, and magnetometers. A processor 130 of the motion sensing device 110 may receive motion data from the motion sensors 136 and transmit the motion data to the computing device 180 through a wireless connection 240 via the network interface hardware 146. The computing device 180 may obtain a trajectory of the motion sensing device 110 based on the received motion data. In some embodiments, a processor 130 of the motion sensing device 110 may obtain the trajectory of the motion sensing device 110 based on the motion data, and send the trajectory information to the computing device 180.

The motion sensing device 110 may also include the tactile input hardware 138 such as a pressure sensor that detects a pressure applied by the user 210 against the motion sensing device 110, or a pressure applied by the motion sensing device 110 against the vehicle 230.

The motion sensing device 110 may send identification information of the user 210 to the computing device 180 along with the motion data. The identification information may be obtained from the user 210. For example, the user 210 input his identification information to the motion sensing device 110 before he starts operating the motion sensing device 110. In some embodiments, the camera 144 of the motion sensing device 110 may capture an image of the user 210 and identify the user 210 based on the image. In some embodiments, the motion sensing device may identify the user 210 by reading an identification RFID tag carried by the user 210. Although FIG. 2 illustrates that the computing device 180 receives information from a single motion sensing device, the computing device 180 may communicate with a plurality of motion sensing devices and receives information from them.

The computing device 180 may receive identification information on the motion sensing device 110. For example, the computing device 180 may receive information on a type of the motion sensing device 110, e.g., a smart sander, a smart helmet, a smart vest, a smart sealing application gun, etc. The computing device 180 may also receive the unique identification for the motion sensing device 110.

The computing device 180 may also receive identification information on the vehicle 230 being manufactured. For example, the computing device 180 may receive vehicle identification number (VIN) for the vehicle 230 from the motion sensing device 110. The motion sensing device 110 may obtain the VIN for the vehicle 230 by capturing an image of the VIN displayed on the vehicle 230 and send the VIN for the vehicle 230 to the computing device 180. In other example, a VIN reader or a barcode reader obtains the VIN of the vehicle 230 and communicates the VIN to the computing device 180. In another example, the VIN of the vehicle 230 may be manually input by the user 210 to the computing device 180.

The processor 182 of the computing device 180 compares the motion data from the motion sensing device 110 with motion data pre-stored in the one or more memory modules 184 of the computing device 180. In embodiments in which the motion sensing device 110 is a smart sanding device, the user 210 moves the smart sanding device along a circular path 220. An actual trajectory of the smart sanding device is obtained based on motion data from the motion sensors 136 of the motion sensing device 110. The actual trajectory of the smart sanding device is compared with an ideal trajectory of the smart sanding device that is pre-stored in the one or more memory modules 184. In some embodiments, the trajectory of the smart sanding device is compared with other trajectories of the smart sanding device operated by other skilled users. More detailed description of comparing motion data will be described below with reference to FIGS. 3A and 3B.

The computing device 180 then calculates a quality score for the user 210 or the vehicle 230 based on the comparison of the motion data from the motion sensing device 110 and the pre-stored motion data. The quality score for the user 210 or the vehicle 230 may be stored in the one or more memory modules 184 of the computing device 180 in association with the identification information of the user 210, the identification information of the motion sensing device 110, and the identification information of the vehicle 230. Table 1 below shows an exemplary database that stores identification information of a user, a motion sensing device, and a vehicle and a quality score.

TABLE 1

| User | Motion sensing device | Vehicle | Quality Score |
| --- | --- | --- | --- |
| User 1 | Smart Sander | Vehicle 1 | 68 |
| User 1 | Smart Application Gun | Vehicle 1 | 71 |
| User 1 | Smart Sander | Vehicle 2 | 69 |
| User 2 | Smart Sander | Vehicle 1 | 89 |
| User 2 | Smart Application Gun | Vehicle 1 | 98 |
| User 2 | Smart Sander | Vehicle 2 | 93 |

The computing device 180 may display the quality score for the user 210 or the vehicle 230 along with identification information on the display 186. In some embodiments, the computing device 180 may display the quality score for the user 210 or the vehicle 230 and identification information of the motion sensing device 110. In some embodiments, a plurality of quality scores for a plurality of users may be displayed on the display 186 simultaneously, such that a supervisor of the manufacturing system may monitor workers at manufacturing lines. In other embodiments, a plurality of quality scores for a plurality of vehicles may be displayed on the display 186 simultaneously.

The computing device 180 may compare the quality score with a threshold score, and display an alarm message on the display if the quality score is less than the threshold score. In some embodiments, the computing device 180 may send an alarm signal to the motion sensing device 110 operated by the user 210, if the quality score for the user 210 is less than a threshold score. The motion sensing device 110 which receives the alarm signal may generate vibration by one or more tactile feedback devices 148 in order to alarm the user 210. In other embodiments, the motion sensing device 110 may generate an audible feedback by the speaker 140 in response to the receipt of the alarm signal in order to alarm the user 210. In other embodiments, the motion sensing device 110 may generate an alarming light by the one or more lights 152 in response to the receipt of the alarm signal. In other embodiments, the computing device 180 may send an email or text message informing that the current quality score for the user 210 is less than the threshold score.

Once manufacturing process for a vehicle is complete, the computing device 180 may retrieve all the quality scores associated with the vehicle 230, and determine whether further investigation should be made with respect to the vehicle 230 based on the quality scores. If it is determined further investigation is needed, the computing device 180 may display that information on the display 186 or communicate that information to a worker at the manufacturing facility.

Figure 3A:
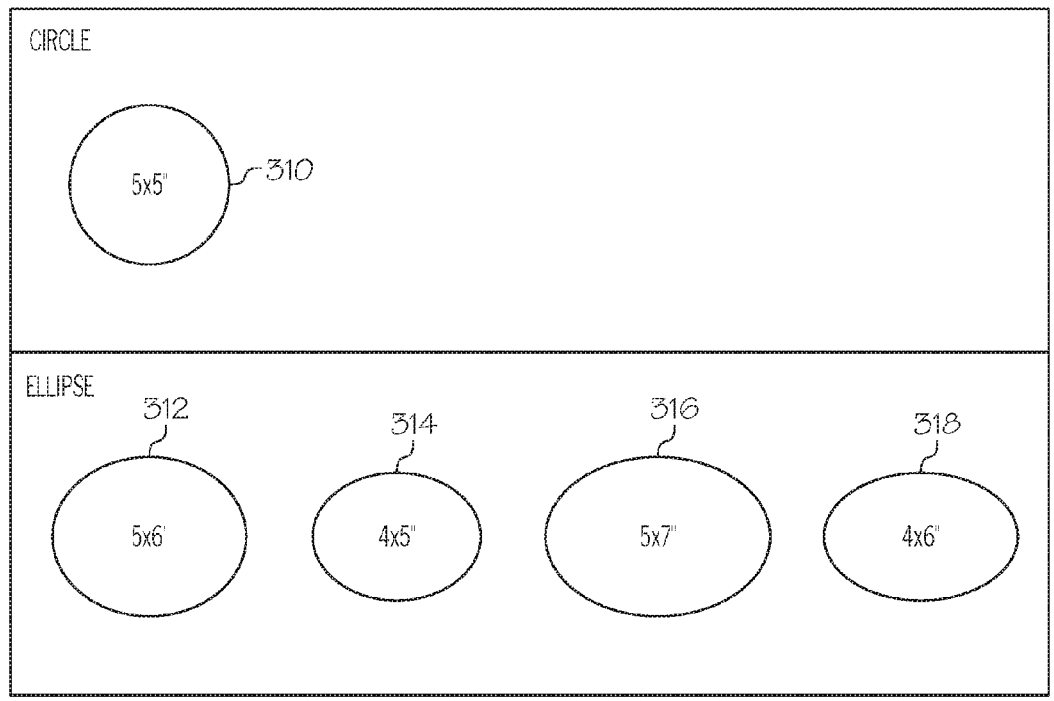
FIG. 3A depicts trajectory samples of a smart sanding device according to one or more embodiments shown and described herein.
Figure 3B:
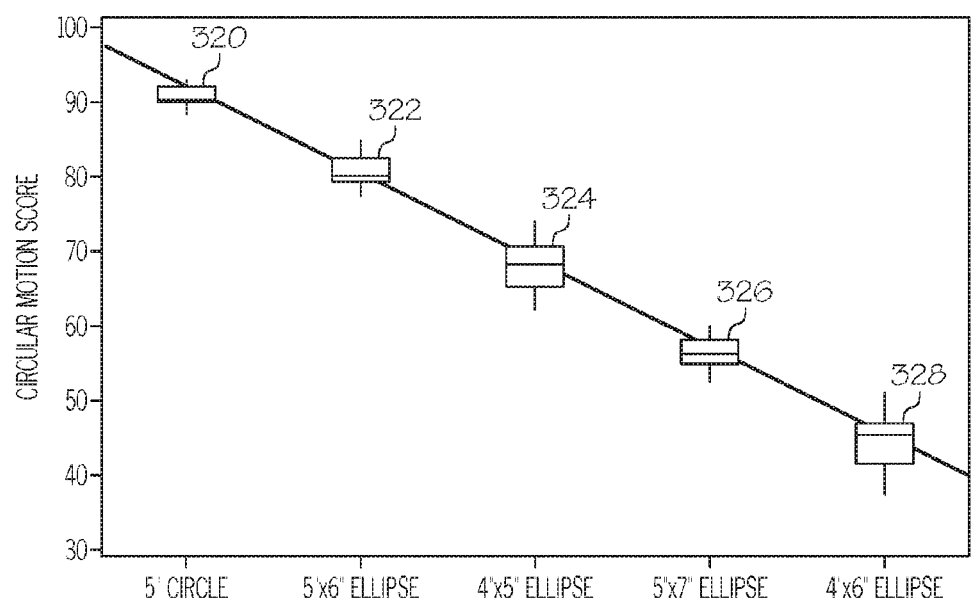
FIG. 3B depicts a correlation between a quality score and a trajectory of a smart sanding device according to one or more embodiments shown and described herein.

FIGS. 3A and 3B illustrate trajectory samples of a smart sanding device and corresponding quality scores. FIG. 3A illustrates trajectory samples of a smart sanding device. Trajectory samples may include circle samples and ellipses samples. A circle 310 is a circle whose diameter is 5 inches. Ellipses 312, 314, 316, and 318 illustrate different shapes of ellipses. Specifically, the ellipse 312 has a minor diameter of 5 inches and a major diameter of 6 inches. The ellipse 314 has a minor diameter of 4 inches and a major diameter of 5 inches. The ellipse 316 has minor diameter of 5 inches and a major diameter of 7 inches. The ellipse 318 has a minor diameter of 4 inches and a major diameter of 6 inches.

FIG. 3B illustrates a correlation between a quality score and a trajectory of a smart sanding device. As illustrated in FIG. 3B, the more circular the trajectory is, the higher score the trajectory sample will have. Specifically, for the circle 310, a box 320 indicates a range of a quality score, e.g., between 89 and 91. For the ellipse 312, a box 322 indicates a range of a quality score, e.g., between 78 and 82. Similarly, for the ellipse 314, a box 324 indicates a quality score range between 63 and 70. For the ellipse 316, a box 326 indicates a quality score range between 52 and 56, and for the ellipse 318, a box 328 indicates a quality score range between 40 and 46.

The correlation between trajectories and quality scores may be stored in the one or more memory modules 184 of the computing device 180, or in the one or more memory modules 132 of the motion sensing device 110. Thus, when the computing device 180 or the motion sensing device 110 obtains an actual trajectory of the motion sensing device 110 based on the motion data from the motion sensors 136, the computing device 180 or the motion sensing device 110 may calculate a quality score for the actual trajectory by referring to the correlation or comparing with the trajectory samples. In some embodiments, the computing device 180 or the motion sensing device 110 may calculate a quality score for the actual trajectory by determining deviation of the actual trajectory from a perfect circle.

In some embodiments, the computing device 180 or the motion sensing device 110 may obtain total circular movements by the user 210 based on the motion data from the motion sensors and calculate the number of circles and ellipses based on trajectory of the smart sanding device. For example, the computing device 180 may obtain a total of 100 circular movements of the smart sanding device made by the user 210, and obtain 60 circles and 40 ellipses. Then, a quality score for the user 210 or the vehicle 230 may be calculated as 60 points determined from the percentage of circles out of the total circular movements.

In some embodiments, a quality score for the user 210 or the vehicle 230 may be obtained by calculating a quality score for each circular movement, and averaging the quality scores. Specifically, for example, the user 210 may conduct one hundred (100) circular movements using the smart sanding device. In this example, out of 100 circular movements, twenty (20) movements correspond to the circle 310, thirty (30) movements correspond to the ellipse 322, thirty (30) movements correspond to the ellipse 324, twenty (20) movements correspond to the ellipse 326. The circle 310 may correspond to a quality score of 90, the ellipse 322 may correspond to a quality score of 80, the ellipse 324 may correspond to a quality score of 66, and the ellipse 326 may correspond to a quality score of 55. The average quality score can be calculated as below:

$$\text{Average quality score} = 90 \times 20/100 + 80 \times 30/100 + 66 \times 30/100 + 55 \times 20/100$$

In some embodiments, a quality score may be obtained in association with a part of the vehicle 230 being sanded by the user 210. For example, if the user 210 sands a hood of the vehicle 230 for 100 times, and the quality score for the 100 times of sanding is 68, then the quality score of 68 is assigned to the hood of the vehicle. Similarly, if the user sands a right lateral surface of the vehicle 230 for 50 times, and the quality score for the 50 times of sanding is 42, then the quality score of 42 is assigned to the right lateral surface of the vehicle. The location and orientation of the smart sanding device may be used to determine which part of the vehicle is being sanded. Specifically, one or more location sensors 150 may detect the location of the smart sanding device, and the motion sensors 136 may detect the orientation of the smart sanding device. In this regard, not only a quality score for the vehicle but also a quality score for each part of the vehicle may be obtained, and the quality scores may be used for further inspection of the vehicle after manufacturing of the vehicle is completed.

Figure 4A:
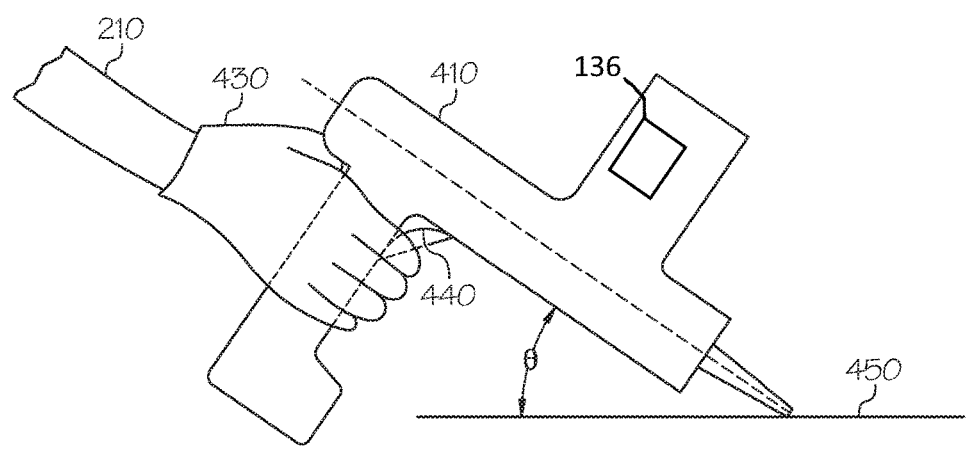
FIG. 4A schematically depicts a perspective view of a smart sealing application gun according to one or more embodiments shown and described herein.
Figure 4B:
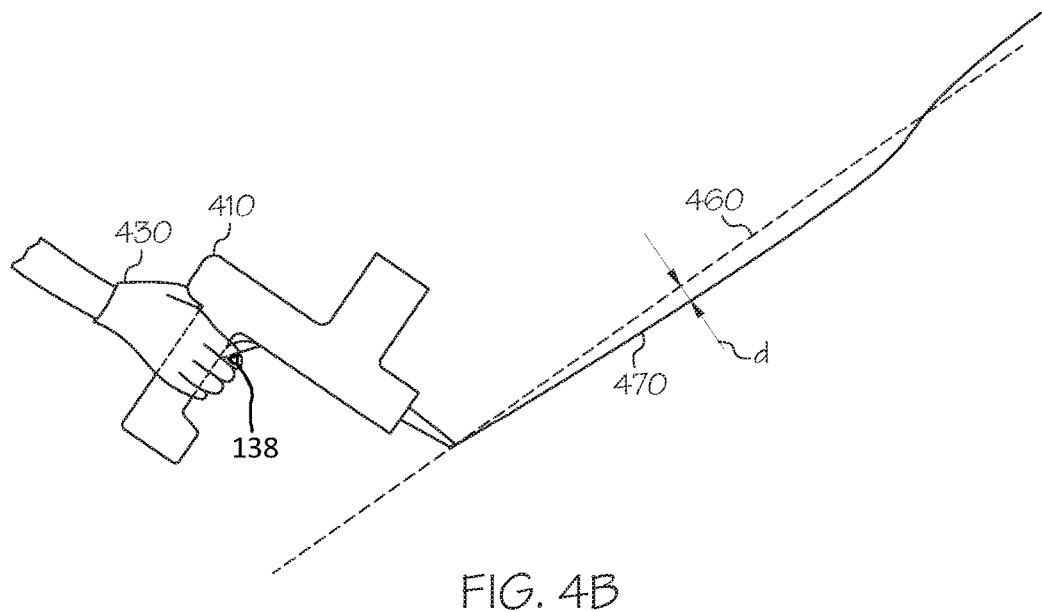
FIG. 4B schematically depicts a perspective view of a smart sealing application gun according to one or more embodiments shown and described herein.

FIGS. 4A and 4B illustrate operating a smart sealing application gun and a smart glove device in accordance with one or more embodiments of the present disclosure. FIG. 4A illustrates applying a smart sealing application gun in accordance with one or more embodiments of the present disclosure. The user 210 wears a smart glove device 430 and holds a smart sealing application gun 410. The smart sealing application gun may include similar elements of the motion sensing device 110 illustrated in FIG. 1. The smart sealing application gun 410 includes a trigger 440 for applying a sealant on a surface. In embodiments, the user 210 holds the smart sealing application gun 410 at an angle of θ against the surface 450 of the vehicle 230. The angle θ may be obtained by the motion sensors 136 of the smart sealing application gun 410. The angle θ may be used to calculate a quality score for the user 210 or the vehicle 230. In some embodiments, the angle θ is compared with a predetermined angle, and the difference between the angel θ and the predetermined angle is calculated. The quality score may be in inverse proportion to the difference. Specifically, if the difference is zero, the quality score is 100. If the difference is 3 degrees, the quality score is 90, and if the difference is 6 degrees, the quality score is 80, and so on. In embodiments, the quality score may be calculated by a processor of the smart sealing application gun and communicated to the computing device. In other embodiments, the smart sealing application gun transmits angle data obtained by the motion sensors to the computing device 180, and the computing device 180 may calculate a quality score based on the angle data from the smart sealing application gun 410.

The smart glove device 430 may include the tactile input hardware 138 such as a pressure sensor. For example, the pressure sensor may be located near a spot where the user's index finger is placed. When the user 210 presses the trigger 440 to apply a sealant on the surface 450, the pressure sensor may detect a pressure applied by the user's index finger. In some embodiments, the detected pressure is compared with a predetermined pressure, and the difference between the detected pressure and the predetermined pressure is calculated. The quality score may be in inverse proportion to the difference. In some embodiments, the quality score may be calculated by a processor of the smart glove device 430 and communicated to the computing device 180. In other embodiments, the smart glove device 430 transmits pressure data obtained by the pressure sensor of the smart glove device 430 to the computing device 180, and the computing device 180 may calculate a quality score based on the received data from the smart glove device 430.

FIG. 4B illustrates applying a smart sealing application gun in accordance with one or more embodiments of the present disclosure. An ideal linear path 460 shows a linear path to be followed by the smart sealing application gun 410. An actual path 470 shows an actual path of the smart sealing application gun 410. The actual path 470 may be slightly curved due to improper use by the user 210. In calculating a quality score for the user 210 in association with the surface 450 of the vehicle, a degree of deviation from the ideal linear path 460 may be used. Specifically, a distance d which illustrates a deviation of the actual path 470 from the ideal linear path 460 may be used for calculating a quality score. For example, the quality score may be in inverse proportion to the distance d. As described above, in embodiments, the quality score may be calculated by a processor of the smart sealing application gun 410 and communicated to the computing device 180. In other embodiments, the smart sealing application gun 410 transmits data obtained by the motion sensors to the computing device 180, and the computing device 180 may calculate a quality score based on the received data from the smart sealing application gun 410.

Although certain kinds of motion sensing devices are described above, any other motion sensing devices may be used to calculate a quality score. In some embodiments, a motion sensing device may include a sound recorder that records a sound generated from coupling electronic components of a vehicle. The recorded sound may be compared with a predetermined waveform to obtain a quality score. In other embodiments, one or more smart wearable devices may be used to calculate a quality score for a user. Specifically, the smart wearable devices may detect a posture of the user based on data obtained by motion sensors of the smart wearable devices. The detected posture may be compared with predetermined data to calculate a quality score. The predetermined data may be obtained by detecting a posture of the most skilled person in terms of using a certain motion sensing device in manufacturing a vehicle.

Figure 5:
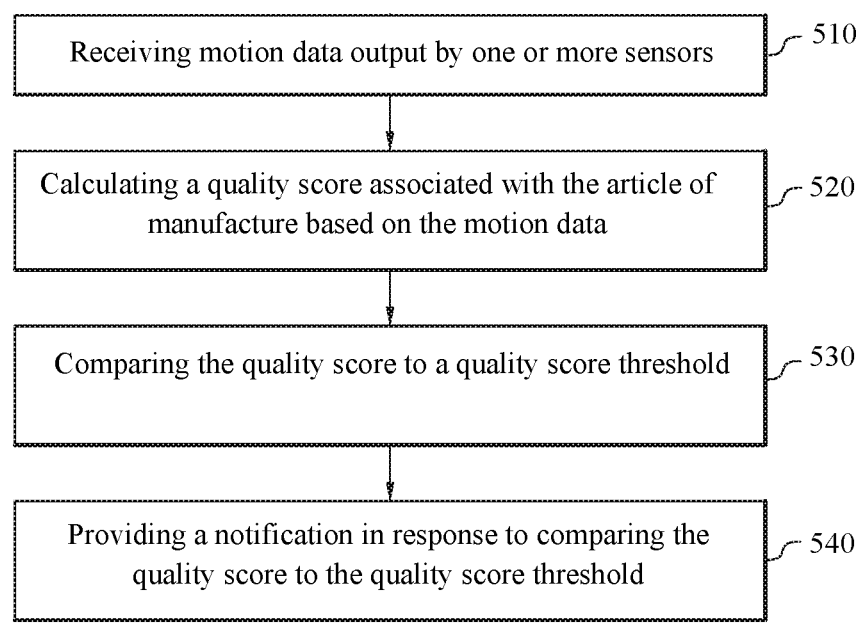
FIG. 5 schematically depicts a flowchart of a method of providing manufacturing feedback, according to one or more embodiments shown and described herein.

FIG. 5 depicts a schematic flowchart representing a method for providing manufacturing feedback in accordance with one or more embodiments of the present disclosure. In step 510, the manufacturing evaluation system 100 receives motion data output by one or more sensors associated with a user manufacturing a vehicle. For example, the computing device 180 of the manufacturing evaluation system 100 may receive a trajectory of the smart sanding device obtained by the motion sensors 136. In other example, the computing device 180 may receive an angle of the smart sealing application gun 410, or a pressure of the smart glove device 430. In another example, the computing device 180 may receive a trajectory of the smart sealing application gun 410. In some embodiments, the computing device 180 receives identification information on the vehicle that the user is manufacturing.

In step 520, the manufacturing evaluation system 100 calculates a quality score associated with the article of manufacture based on the motion data. In some embodiments, the computing device 180 may calculate a deviation of the motion data from predetermined data. The predetermined data may be, for example, ideal circular motion trajectory for the smart sanding device, an ideal angle for the smart sealing application gun, an ideal pressure for the smart glove device, ideal linear path for the smart sealing application gun, or a combination thereof. Then, the computing device 180 may calculate a quality score based on the calculated deviation.

In step 530, the manufacturing evaluation system 100 compares the quality score to a quality score threshold. In step 540, the manufacturing evaluation system 100 provides a notification in response to comparing the quality score to the quality score threshold. In some embodiments, the computing device 180 may output an alarm notification if the quality score is less than a threshold value. In embodiments, the computing device 180 may display an alarm notification on the display 186. In other embodiments, the computing device 180 may send a signal for triggering alarm in a motion sensing device. For example, when the computing device 180 sends a signal for triggering alarm to a smart sanding device, the smart sanding device may vibrate to alert the user 210 of improper usage. In other example, when the computing device 180 sends a signal for triggering alarm to a smart sealing application gun, the one or more lights 152 of the smart sealing application gun may blink to alert the user 210 of improper usage. In another example, the computing device 180 may send an email notifying improper usage to a supervisor's email account.

As described above, the computing device 180, the smart sanding device or the smart sealing application gun provides feedback to a user with respect to improper usage. In some embodiments, the computing device 180 may display a proper trajectory or usage instructions for the smart sanding device on its screen, such that the user can improve his or her operations of the smart sanding device. In some embodiments, the computing device 180 may display a proper degree of pressure or an ideal trajectory for the smart sealing application gun on its screen, such that the user can improve his or her operations of the smart sealing application gun.

While the embodiments depicted and described herein include a motion sensing device and a computing device in association with manufacturing a vehicle, embodiments are not limited thereto. The manufacturing evaluation system may apply to any manufacturing activities including, but not limited to, manufacturing any consumer electronic device, manufacturing furniture, constructing new buildings, processing foods, etc.

It should be understood that embodiments described herein are directed to manufacturing evaluation system including various motion sensing devices capable of tracking motions of a user. The manufacturing evaluation systems described herein receive motion data obtained by one or more sensors of a motion sensing device associated with a user manufacturing a vehicle, receive identification information on the vehicle, calculate a deviation of the motion data from predetermined data, calculate a quality score for the vehicle based on the comparison and the identification information, and provide a feedback if the quality score is less than a predetermined threshold value. By providing a feedback, the manufacturing evaluation systems described herein enhance the overall manufacturing quality. Specifically, manufacturing evaluation systems provide what portions of which vehicles have issues or poor quality by monitoring workers' motions with a plurality of motion sensors of motion sensing devices. Furthermore, the manufacturing evaluation system described herein provides immediate feedback to workers with low skills or less experience.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A manufacturing evaluation system comprising:
    one or more motion sensors configured to output motion data in response to motions of a user in association with manufacturing of an article;
    a motion sensing device comprising the one or more motion sensors;
    a processor communicatively coupled to the one or more motion sensors;
    a memory module communicatively coupled to the processor; and
    machine readable instructions stored in the memory module that cause the manufacturing evaluation system to perform at least the following when executed by the processor:
        receiving the motion data output by the one or more motion sensors;
        obtaining a trajectory of the motion sensing device based on the motion data;
        comparing the trajectory with a plurality of predetermined trajectories, each of the plurality of predetermined trajectories being assigned a quality score;
        determining a corresponding predetermined trajectory of the plurality of predetermined trajectories that corresponds to the trajectory of the motion sensing device;
        comparing the quality score of the corresponding predetermined trajectory to a quality score threshold; and
        providing a notification in response to comparing the quality score to the quality score threshold.

2. The manufacturing evaluation system of claim 1, wherein the machine readable instructions stored in the memory module cause the manufacturing evaluation system to further perform, when executed by the processor, receiving identification information on the article.

3. The manufacturing evaluation system of claim 1, wherein the machine readable instructions stored in the memory module cause the manufacturing evaluation system to, when executed by the processor, provide a feedback in response to the quality score being less than the quality score threshold.

4. The manufacturing evaluation system of claim 1, wherein the predetermined trajectory is trajectory of other users.

5. The manufacturing evaluation system of claim 1, wherein the motion sensing device is a smart sanding device, and the trajectory is a circular trajectory of the smart sanding device.

6. The manufacturing evaluation system of claim 1, wherein the motion sensing device is a smart sealing application gun, and the trajectory is a trajectory of the smart sealing application gun.

7. The manufacturing evaluation system of claim 1, wherein the motion sensing device is a smart sealing application gun, and the motion data includes an angle of the smart sealing application gun against a surface proximate to the smart sealing application gun, wherein the machine readable instructions stored in the memory module cause the motion sensing device to perform at least the following when executed by the processor:
calculating a deviation of the angle from a predetermined angle; and
calculating the quality score based on the deviation.

8. The manufacturing evaluation system of claim 1, wherein the motion sensing device is a smart glove device including a pressure sensor, and the motion data includes a pressure obtained by the pressure sensor.

9. The manufacturing evaluation system of claim 1, wherein providing the notification comprises at least one of providing an audible alarm sound, providing the quality score on a display of the manufacturing evaluation system, and sending a signal for triggering vibration to the motion sensing device.

10. A method for providing manufacturing evaluation feedback, comprising:
receiving, at a computing device, motion data output by one or more sensors of at least one motion sensing device associated with a user manufacturing an article;
obtaining a circular trajectory of the motion sensing device based on the motion data;
comparing the circular trajectory with a plurality of predetermined trajectories, each of the plurality of predetermined trajectories being assigned a quality score;
determining a corresponding predetermined trajectory of the plurality of predetermined trajectories that corresponds to the circular trajectory of the motion sensing device;
comparing, by the processor of the computing device, the quality score of the corresponding predetermined trajectory to a quality score threshold; and
providing, by the processor of the computing device, a notification in response to comparing the quality score to the quality score threshold.

11. The method of claim 10, further comprising
receiving, at the computing device, identification information on the article.

12. The method of claim 10, wherein providing the notification in response to comparing the quality score to the quality score threshold comprises
sending, by the processor, a feedback signal to the at least one motion sensing device based on the quality score.

13. A motion sensing device for providing manufacturing evaluation, comprising:
one or more sensors configured to obtain motion data of the motion sensing device associated with a user in response to motions of the user in association with manufacturing of an article;
a processor communicatively coupled to the one or more sensors;
a memory module communicatively coupled to the processor; and
machine readable instructions stored in the memory module that cause the motion sensing device to perform at least the following when executed by the processor:
obtaining a trajectory of the motion sensing device based on the motion data;
comparing the trajectory with a plurality of predetermined trajectories, each of the plurality of predetermined trajectories being assigned a quality score;
determining a corresponding predetermined trajectory of the plurality of predetermined trajectories that corresponds to the trajectory of the motion sensing device;
comparing the quality score of the corresponding predetermined trajectory to a quality score threshold; and
providing a notification in response to comparing the quality score to the quality score threshold.

14. The motion sensing device of claim 13, wherein the article is a vehicle.

15. The motion sensing device of claim 13, wherein the motion sensing device is a smart sanding device, and the trajectory is a circular trajectory of the smart sanding device.

16. The motion sensing device of claim 13, wherein the motion sensing device is a smart sealing application gun, and the trajectory is a trajectory of the smart sealing application gun.

17. The motion sensing device of claim 13, wherein the motion sensing device is a smart glove device including a pressure sensor, and the motion data is a pressure obtained by the pressure sensor.

* * * * *